(12) United States Patent
Terry

(10) Patent No.: US 10,266,192 B2
(45) Date of Patent: Apr. 23, 2019

(54) SPORTS CHAIR CADDIE

(71) Applicant: Jason Terry, Littleton, CO (US)

(72) Inventor: Jason Terry, Littleton, CO (US)

(*) Notice: Subject to any disclaimer, the term of this patent is extended or adjusted under 35 U.S.C. 154(b) by 0 days.

(21) Appl. No.: 15/244,275

(22) Filed: Aug. 23, 2016

(65) Prior Publication Data

US 2017/0158214 A1    Jun. 8, 2017

Related U.S. Application Data

(60) Provisional application No. 62/264,271, filed on Dec. 7, 2015.

(51) Int. Cl.
| | |
|---|---|
| *B62B 5/00* | (2006.01) |
| *B62B 1/26* | (2006.01) |
| *A47C 4/00* | (2006.01) |
| *A47B 3/10* | (2006.01) |
| *A47B 97/00* | (2006.01) |

(52) U.S. Cl.
CPC ............ *B62B 1/26* (2013.01); *A47C 4/00* (2013.01); *B62B 5/00* (2013.01); *B62B 5/0013* (2013.01); *A47B 3/10* (2013.01); *A47B 97/00* (2013.01)

(58) Field of Classification Search
CPC .............. B62B 1/04; B62B 1/12; B62B 3/02
USPC ....... 280/47.19, 47.25, 47.35, 645, 651, 652
See application file for complete search history.

(56) References Cited

U.S. PATENT DOCUMENTS

| | | | | |
|---|---|---|---|---|
| 3,704,025 A | * | 11/1972 | Cerveny | A61G 5/08 280/47.19 |
| 3,997,213 A | * | 12/1976 | Smith | A47C 4/28 280/30 |
| 4,262,928 A | * | 4/1981 | Leitzel | B62B 1/042 280/47.26 |
| 4,460,188 A | * | 7/1984 | Maloof | B62B 1/20 280/30 |
| 5,154,441 A | * | 10/1992 | White | A47B 31/04 108/120 |
| 5,159,777 A | * | 11/1992 | Gonzalez | A01K 97/08 280/47.19 |
| 5,362,079 A | * | 11/1994 | Graham | B62B 1/12 280/47.23 |
| 5,364,120 A | * | 11/1994 | Shimansky | A61G 5/00 280/47.2 |
| 5,464,237 A | * | 11/1995 | Saporiti | B62B 1/20 188/6 |
| 5,636,852 A | * | 6/1997 | Sistrunk | B62B 1/12 248/156 |
| 5,857,695 A | * | 1/1999 | Crowell | B62B 3/007 280/30 |
| 5,944,333 A | * | 8/1999 | Kent | B62B 1/10 280/204 |
| 6,113,129 A | * | 9/2000 | Marques | B62B 1/12 248/129 |

(Continued)

*Primary Examiner* — Jeffrey J Restifo
(74) *Attorney, Agent, or Firm* — Furr Law Firm; Jeffrey Furr, Esq.

(57) ABSTRACT

The current invention is a Sport Chair Caddie. It is a wheeled carrier for folding sports chairs and other items that may be needed. It is made from a light-weight, weather-proof material, and it is designed to a compact traveling unit. The device can carry a number of folding sport chairs and has storage space for personal belongings. It has a table top can be set up to provide a place to work on a laptop or a tablet, and a level surface for beverages. The caddie can be secured to the ground for stability.

8 Claims, 6 Drawing Sheets

(56) References Cited

U.S. PATENT DOCUMENTS

| | | | | |
|---|---|---|---|---|
| 6,131,925 A * | 10/2000 | Weldon | B62B 1/12 | 280/30 |
| 6,648,349 B1 * | 11/2003 | Waller | B62B 3/02 | 280/47.35 |
| 6,883,267 B1 * | 4/2005 | Pruitt | A01K 97/22 | 280/47.19 |
| 7,040,635 B1 * | 5/2006 | Remole | A47C 7/002 | 248/129 |
| 7,168,713 B2 * | 1/2007 | Udall | A45C 5/14 | 280/47.19 |
| 7,325,815 B2 * | 2/2008 | Rush | A61G 5/00 | 280/47.18 |
| 7,338,054 B2 * | 3/2008 | Pint | B62B 3/02 | 280/47.35 |
| 7,703,795 B2 * | 4/2010 | Williamson | A01K 97/10 | 280/40 |
| 7,762,363 B1 * | 7/2010 | Hirschfeld | B60K 1/04 | 180/65.1 |
| 7,819,407 B1 * | 10/2010 | Charitun | B62B 1/12 | 280/47.18 |
| 7,857,328 B1 * | 12/2010 | Boss | B62B 1/14 | 280/47.131 |
| 7,946,609 B2 * | 5/2011 | Johnson | A45C 5/14 | 280/47.19 |
| 8,136,831 B1 * | 3/2012 | Caruso | B62B 7/145 | 280/47.35 |
| 8,282,119 B1 * | 10/2012 | Caksa | B62B 7/008 | 280/642 |
| 8,602,425 B1 * | 12/2013 | Meier, III | B62B 1/14 | 280/47.26 |
| 2008/0238012 A1 * | 10/2008 | Carter | B62B 3/02 | 280/47.35 |
| 2009/0230646 A1 * | 9/2009 | Chapman | B62B 1/12 | 280/47.19 |
| 2010/0059950 A1 * | 3/2010 | Coghill, Jr. | B62B 1/14 | 280/47.26 |
| 2010/0102524 A1 * | 4/2010 | Larsen | B62B 3/007 | 280/35 |
| 2011/0001298 A1 * | 1/2011 | Rice | B62B 1/12 | 280/47.34 |
| 2017/0043800 A1 * | 2/2017 | Chaloux | B62B 1/12 | |

* cited by examiner

SPORTS CHAIR CADDIE

CROSS-REFERENCES TO RELATED APPLICATIONS (IF ANY)

This application claims the priority date of Provisional Application No. 62/264,271 filed on 7 Dec. 2015.

BACKGROUND

1. Field of the Invention

This invention relates to a chair caddie and particularly, to a device which may be utilized to meet the needs of a sports spectator.

2. Description of Prior Art

Participation in youth sports has grown for boys and girls. These organized sports provide benefits of exercise and companionship with teammates, allowing children to compete in a safe and fun environment and to develop skills of perseverance, training, work ethic, and at a young age, body kinesthesis (ability to know how to move one's body). There is no easy way to determine how many children are participating in youth sports, but strong parental support is an important factor in children's ability to participate and be successful.

Parents have spent countless numbers of hours watching his sons practice and play their games. Children practice baseball, soccer, football, and field hockey on any piece of vacant land, and there are rarely seats or bleachers for the parents to sit while watching. You can spend hours watching parents struggle to carry chairs, coolers, umbrellas, and other paraphernalia to and from playing fields.

There is still room for improvement in the art.

SUMMARY OF THE INVENTION

The current invention is a Sport Chair Caddie. The caddie is a wheeled carrier for folding sports chairs and other items that may be needed for a spectator. The caddie will have a base, a table top, strap brackets and an umbrella holder for an umbrella.

It is made from a light-weight, weather-proof material, and it is designed to a compact traveling unit. It can carry up to four folding sport chairs at a time. The caddie will have locking straps that are used to secure the folded chairs to the base unit.

The device will have a storage bag for personal items, such as phones, tablets, water bottles, cameras, etc., that attaches to one side of the center post of the frame, and the handy table top fits into slots on the other side. The table top can be set up to provide a place to work on a laptop or a tablet, and a level surface for beverages.

An umbrella of any size slips out of the hollow handle to provide protection from rain or sunshine. When it is extended and locked to the frame with a bracket, the base can be staked to the ground to provide stability on windy days. The ground stakes are carried in the attached bag.

When not in use, the whole unit, including the wheels, folds up compactly for convenient storage. The caddie may include a solar-powered cell to allow for charging phones, iPads, and other electronic devices.

BRIEF DESCRIPTION OF THE DRAWINGS

Without restricting the full scope of this invention, the preferred form of this invention is illustrated in the following drawings.

DESCRIPTION OF THE PREFERRED EMBODIMENT

Figure 1:
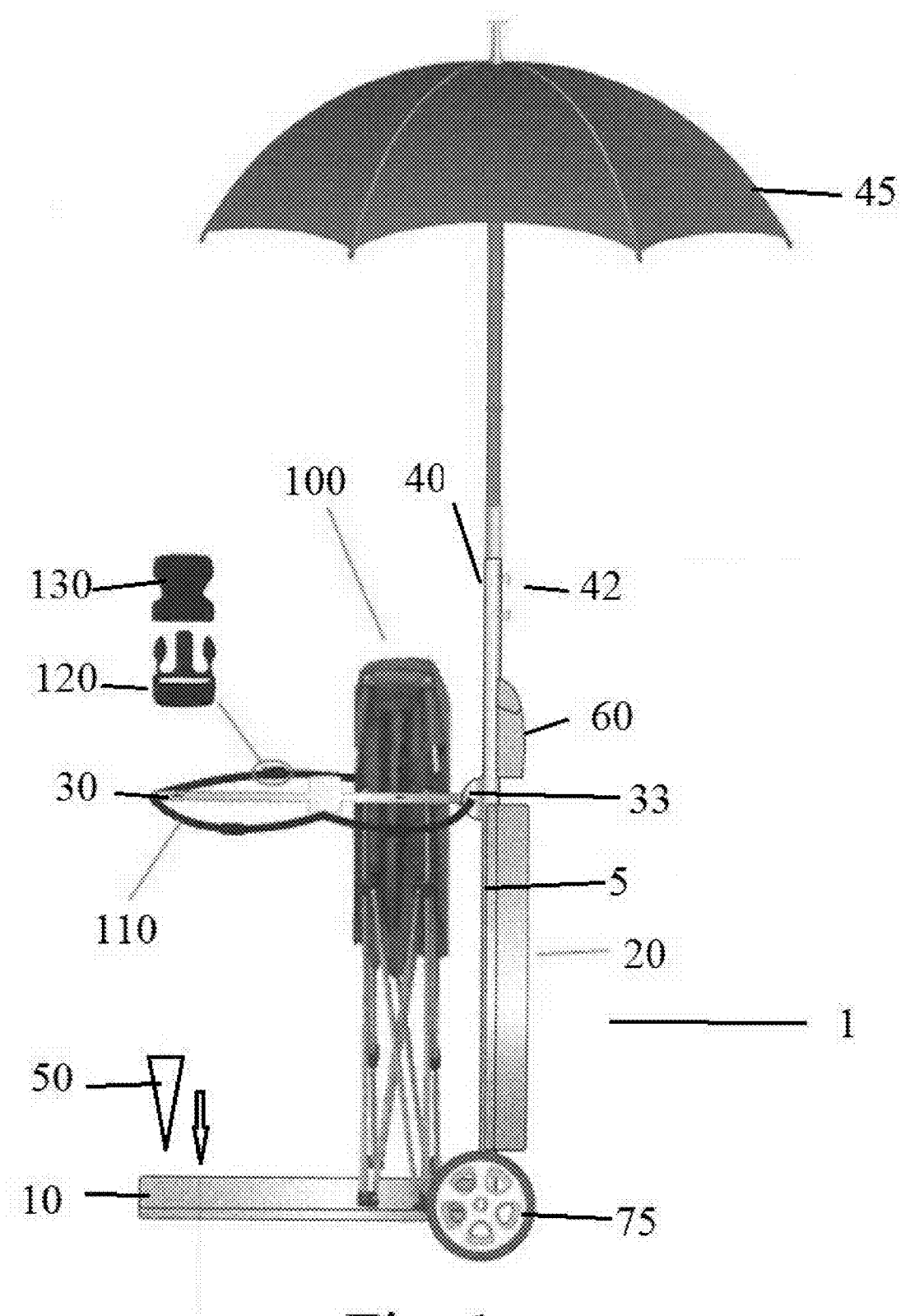
FIG. 1 is a side view of the preferred embodiment with an umbrella attached.
Figure 2:
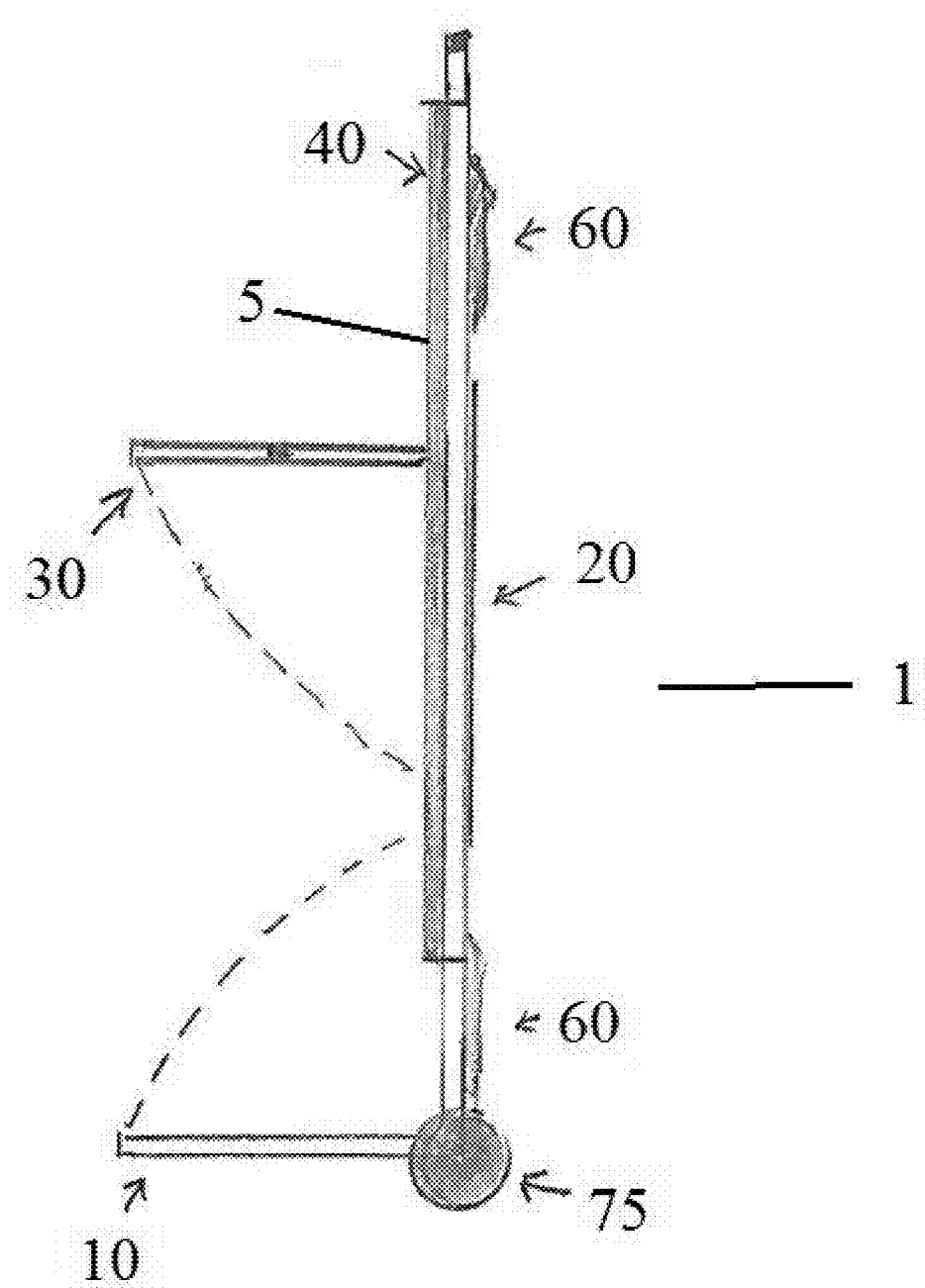
FIG. 2 is a side view of the embodiment.
Figure 3:
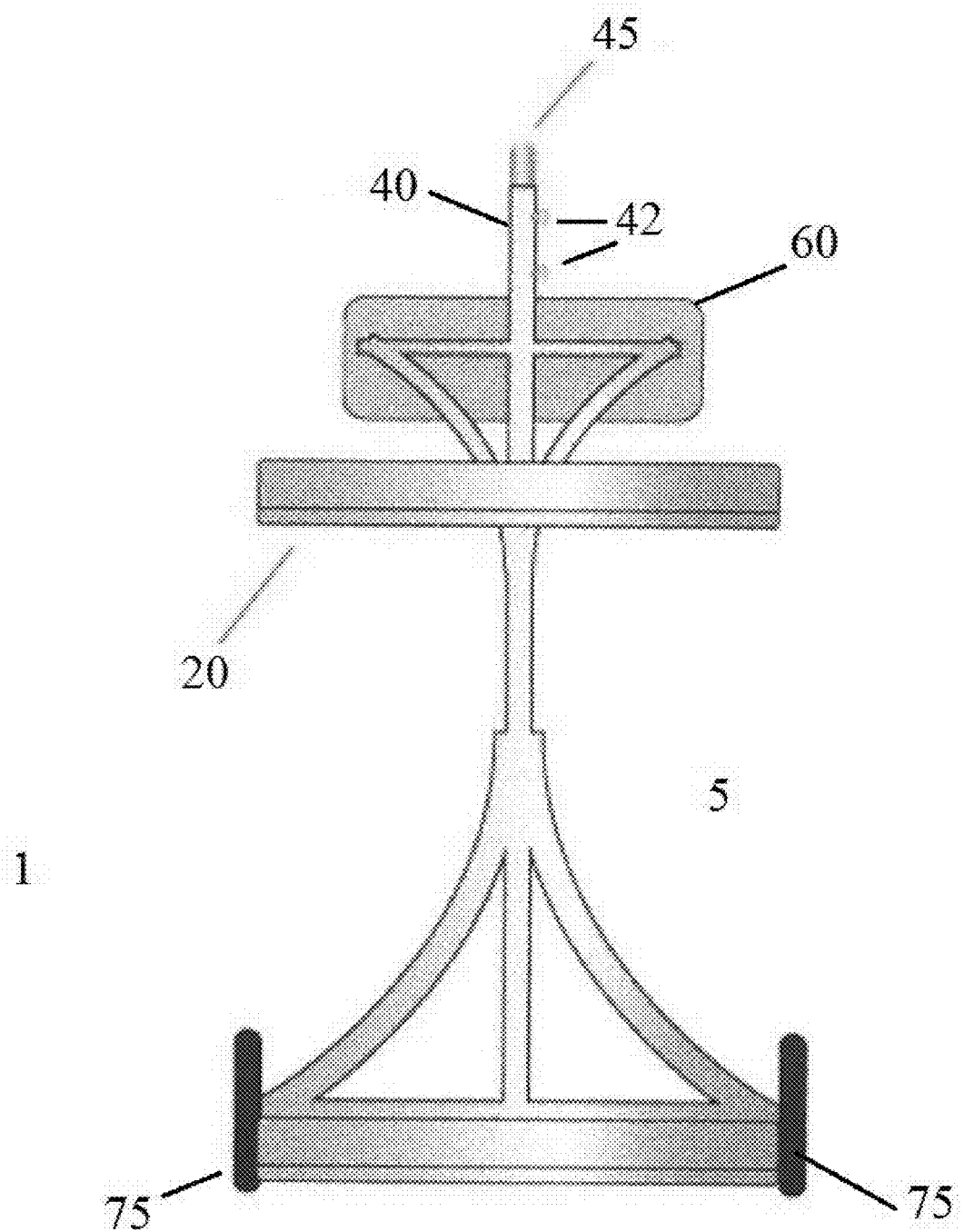
FIG. 3 is front view with the table top.

There are a number of significant design features and improvements incorporated within the invention.

The current invention is a Sport Chair Caddie 1 as shown in FIGS. 1 through 5. The caddie is a wheeled carrier for folding sports chairs 100 and other items that may be needed for a spectator. The caddie 1 will have a base 10, a table top 20, strap bracket 30 and an umbrella holder 40 for an umbrella 45.

It is made from a light-weight, weather-proof material, and it is designed to a compact traveling unit. It can carry up to four folding sport chairs at a time. The caddie 1 will have locking straps 110 are used to secure the folded chairs 100 to the frame 5 of the caddie 1.

The device 1 will have a storage bag 60 for personal items, such as phones, tablets, water bottles, cameras, etc., that attaches to one side of the center post of the frame 5, and the handy table top fits into slots on the other side. The table top 20 can be set up to provide a place to work on a laptop or a tablet, and a level surface for beverages.

An umbrella 45 of any size slips out of the hollow handle 40 to provide protection from rain or sunshine. When it is extended and locked to the frame 5 with an umbrella bracket 42, the base 10 can be staked to the ground to provide stability on windy days. The ground stakes 50 are carried in the attached stakes bag 85.

Figure 4:
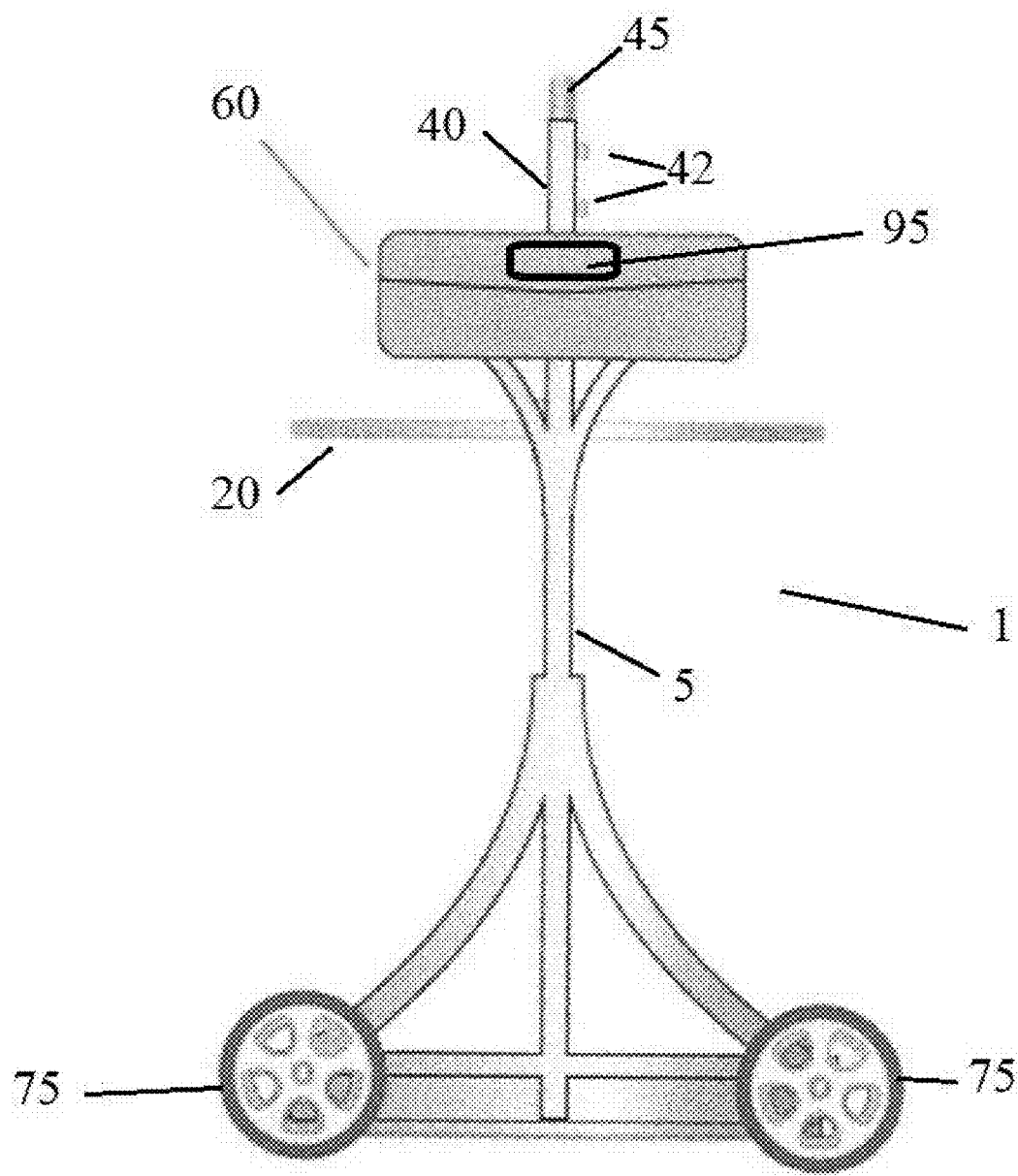
FIG. 4 is a back view.

When not in use, the whole unit, including the wheels 75, folds up compactly for convenient storage as shown in FIG. 4.

The base 10 needs to be close enough to the ground to use the stakes 50 in the ground but still needs to be high enough off the ground for free wheel movement. The base 10 folds flat into the frame has shown in FIG. 5. The base 10 folds out to serve as a solid, secure base for the caddie 1 so that it securely stands on its own. It also provides a platform when extended on which the chairs 100 are set on when they are held by the caddie 1 as shown in FIG. 1.

The table top 20 is 18 inches by 12 inches in the preferred embodiment and can be collapsible and expandable. The table top 20 would have holes built in to allow placement in the back of the frame 5 where is it placed for storage.

The strap bracket 30 holds the straps 110 that connect to hold the chairs 100 in place. It is flat against the frame 5 when stored and perpendicular when securing the chairs 100 with the chair strap 110. The one or more straps 110 connect to the strap bracket 30. The strap bracket 30 must be strong with the ability to put up and lock into place and then easily unlock for storage position with a strap bracket hinging means 33. Once extended, the table top 20 would be placed on the strap bracket 15 which provides a safe, secure and flat location for the table top 20 allowing the user to use it for laptops or as a writing table top. The table top 20 fits into the table top holes in the strap bracket 30 securing the table top 20 in place.

The straps 110 will have a female 120 and male 130 fastener clip one on each of the two straps that connect to secure the chairs 100. The strap 110 length is adjustable using the fastener clips.

Figure 5:
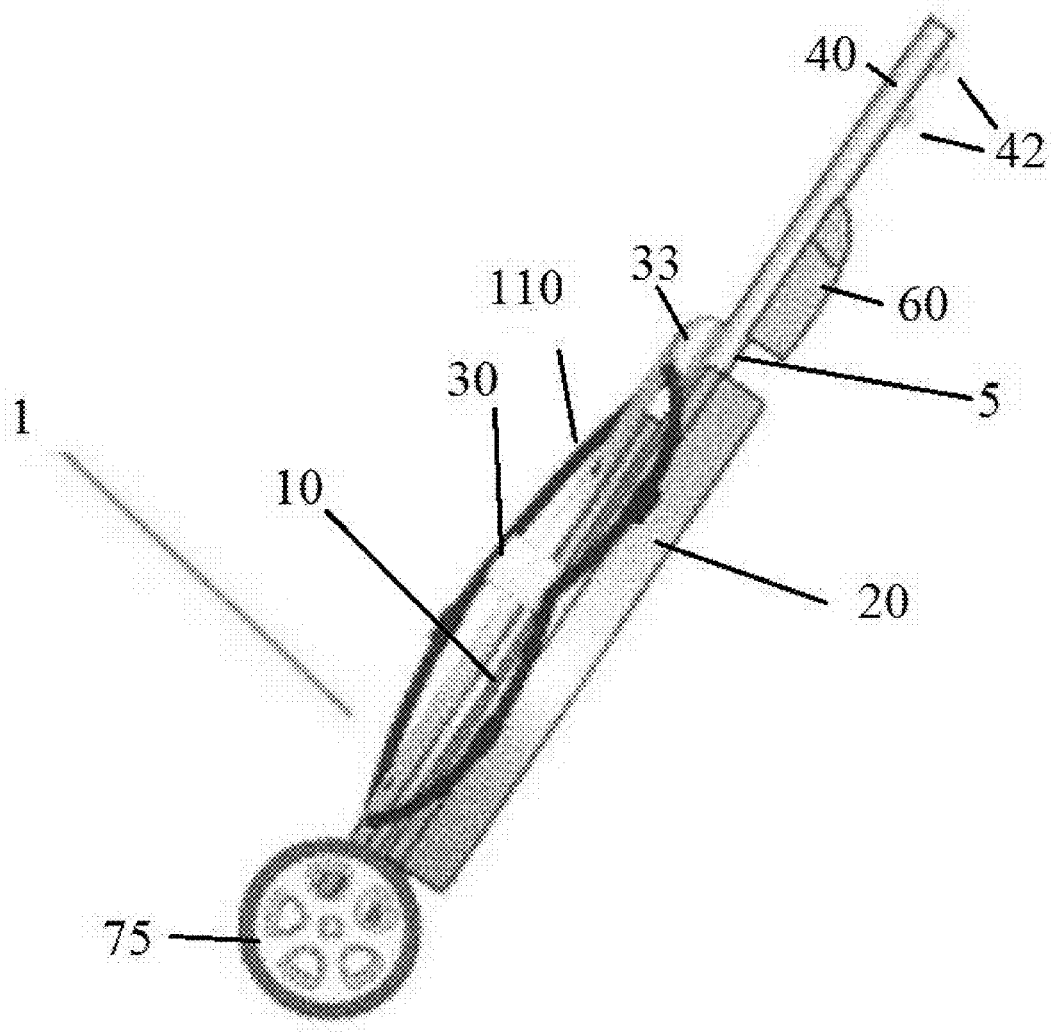
FIG. 5 is a side view.

In the preferred embodiment, the base 10 and the straps are both 18 by 12 inches and are 25 inches apart from each other so the fold together against the frame as shown in FIG. 5.

In the preferred embodiment, the frame 5 has a height of 40 inches and a width of between 8 and 10 inches. It is in the shape of an inverted T with a center post connected to cross bar at the bottom where the wheels 75 are connected. The can be support bars that extend from the center post to the cross bar at the bottom and for the storage bag 60. The wheels 75 would be 5 inches in diameter and be made of a harden rubber. The wheels 75, in the preferred embodiment, would fold into the base when not being used and fold out and lock into place when in use as shown in FIG. 4. This allows the caddie 1 to be flat for storage.

The base 10 would be 18 by 12 inches, have 1 inch side walls with four corners openings to allow for the stakes 50. The stakes 50 would be standard stakes 4 to 6 inches in length. The stakes 50 are stored in a hoop and latch stakes pouch 85.

There is a strap bracket 30 has a dimension in the preferred embodiment of 18 by 12 inches and can fold flat against the frame 5 and in the preferred embodiment is 26 inches from the base 10.

Figure 6:
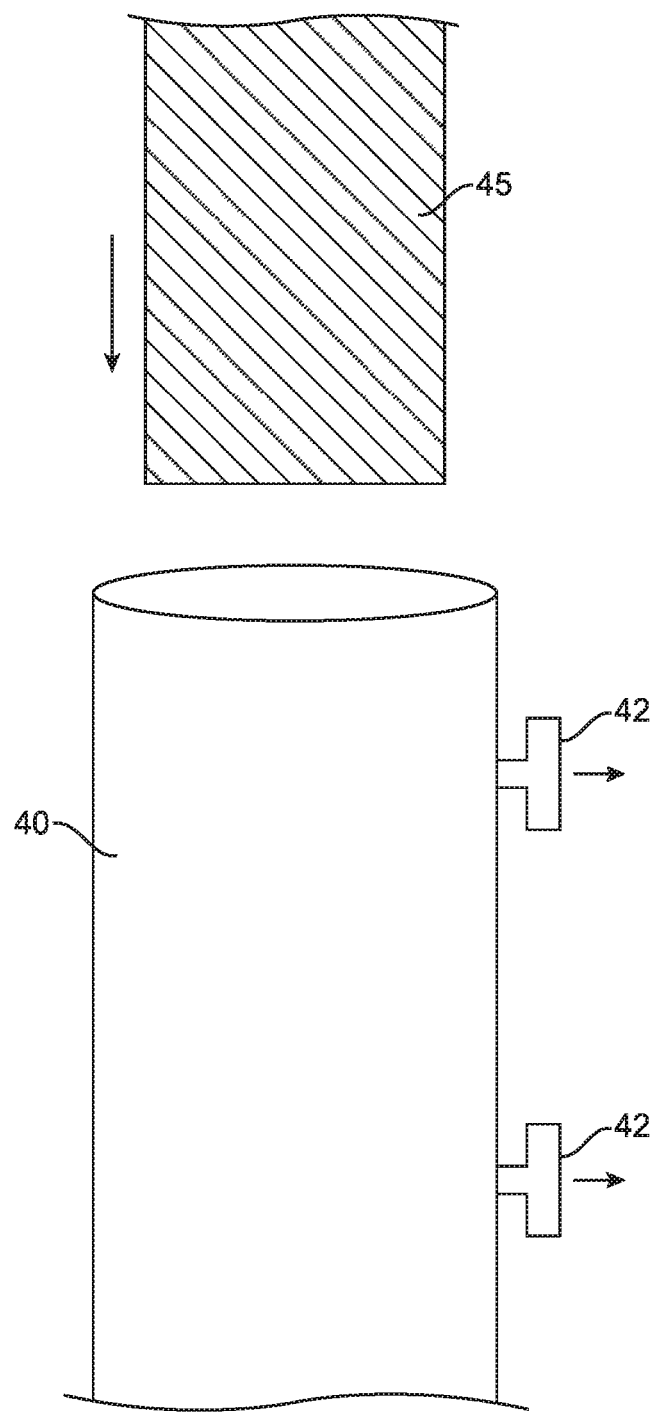
FIG. 6 is a view of the umbrella fitting into the umbrella stand.

An umbrella tube 40 is a 1½ inch tube for umbrella 50 storage. It is 36 inches in length and is attached to the frame 5. As shown in FIG. 6, there are umbrella clamps 42 at the top of the tube 40 that clamps onto the handle of a umbrella allowing the user to have the open umbrella 45 to be held by the caddie 1. In the preferred embodiment, there will be a handle that is attached to the umbrella tube 40

In one embodiment, the caddie 1 would include a solar-powered cell 95 to allow for charging phones, iPads, and other electronic devices.

Advantages

The unique features of this product will provide the following benefits for consumers everywhere:
- A convenient way to carry chairs and other items needed when attending outdoor activities, like children's games
- Is light-weight, durable, weather proof, and easy to maneuver with the handle and all-terrain wheels
- Folds compactly for storage when not in use
- Includes stakes to secure the unit to the ground when needing a solid table and a stand for the umbrella
- The storage bag for personal items in weatherproof and can be closed with a zipper or Velcro Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A sport chair caddie device comprising:
   an inverted T shape frame with a center post with two sides connected to a cross bar at the bottle with a base connected to the bottom of the frame with support bars that extend from the center post to the cross bar, with an umbrella tube having a top with umbrella clamps at the top of the tube connected to said frame with a strap bracket connected to the frame, having one or more adjustable straps connected to the strap bracket, having a storage bag connected to one side of the center post with a table top connected to the other side, where a plurality of wheels is connected to the cross bar and where the wheels and the strap bracket fold flat into the base and where the base folds flat against the frame where the base has one side wall with four corners openings with stakes to go through.

2. A sport chair caddie device according to claim 1 further comprising:
   having a removable table top connected to the frame.

3. A sport chair caddie device according to claim 2 further comprising:
   where said table top can be connected to the strap bracket.

4. A sport chair caddie device according to claim 1 further comprising:
   where a plurality of chairs are set on the base and held in place by the plurality of straps connected to the strap bracket.

5. A sport chair caddie device according to claim 1 further comprising:
   made of a light weight, weatherproof material.

6. A sport chair caddie device according to claim 1 further comprising:
   where the frame has a height of 40 inches and a width between 8 and 10 inches.

7. A sport chair caddie device according to claim 1 further comprising:
   a hollow handle attached to the umbrella tube.

8. A sport chair caddie device according to claim 1 further comprising:
   the straps will have a female and male fastener clip one on each of the two straps.

\* \* \* \* \*